(12) United States Patent
Albinger et al.

(10) Patent No.: US 6,598,381 B2
(45) Date of Patent: Jul. 29, 2003

(54) MULTIPLE-PART ATTACHMENT FOR AN AGRICULTURAL MACHINE

(75) Inventors: Bernd Albinger, Hochdorf-Schweinhausen (DE); Manfred Klotz, Sauldorf-Bietingen (DE)

(73) Assignee: CLAAS Saulgau GmbH, Saulgau (DE)

( * ) Notice: Subject to any disclaimer, the term of this patent is extended or adjusted under 35 U.S.C. 154(b) by 0 days.

(21) Appl. No.: 09/923,156

(22) Filed: Aug. 6, 2001

(65) Prior Publication Data

US 2002/0035826 A1 Mar. 28, 2002

(30) Foreign Application Priority Data

Aug. 7, 2000 (DE) .......................................... 100 39 097

(51) Int. Cl.[7] .............................................. A01D 34/42
(52) U.S. Cl. ......................................... 56/15.2; 56/15.9
(58) Field of Search ................................. 56/14.7, 14.9, 56/15.1, 15.2, 15.9, 51, 119, DIG. 14, 208, 212, 214, 228

(56) References Cited

U.S. PATENT DOCUMENTS 3,258,901 A * 7/1966 Van Der Lely et al. ......... 56/2
4,739,608 A * 4/1988 Arnold .......................... 56/119
5,329,753 A * 7/1994 Arnold et al. ................. 56/119
5,673,543 A * 10/1997 Richardson et al. .......... 56/228
5,845,472 A * 12/1998 Arnold .......................... 56/228

FOREIGN PATENT DOCUMENTS

DE        41 31 491        3/1993

* cited by examiner

Primary Examiner—Thomas B. Will
Assistant Examiner—Meredith Petravick
(74) Attorney, Agent, or Firm—Husch & Eppenberger, LLC; Robert E. Muir; Richard J. Musgrave

(57) ABSTRACT

A method and an apparatus for pivoting the dividers of an agricultural machine for the harvesting of row crops. A multiple-part attachment having feeder housings to receive the row crops is attached to the front of the agricultural machine. The multiple-part attachment has side frames that are pivotable from a working position to a non-working position. Outer row crop dividers are arranged on the side frames in such a way that when the side frames are pivoted, the outer row crop dividers move relative to the adjacent inner row crop dividers. The relative movement of the outer row crop dividers prevents them from colliding with each other when the side frames are in a non-working position and allows for maximum feeder housing width when the side frames are in a working position.

19 Claims, 6 Drawing Sheets

MULTIPLE-PART ATTACHMENT FOR AN AGRICULTURAL MACHINE

BACKGROUND OF THE INVENTION

The present invention relates generally to agricultural machinery and more particularly to an apparatus and method for pivoting the attachment sides of an agricultural harvesting machine having a multiple-part attachment, wherein the attachment sides are pivotable from a working position to a non-working position.

German Patent Publication No. 41 31 491 A1 discloses a multi-part front attachment of an agricultural machine for the harvesting of stalk crops. The attachment has sides that can be pivoted from a working position to a transport position, thus reducing its width for easier transport. The attachment sides are moved into the transport position by means of a carriage guide in cooperation with pivot shafts. When in the transport position, the attachment sides are nearly vertical. Such an arrangement of the attachment sides places an increased load on the agricultural machine due to the fact the attachment sides are at a great distance from the center of gravity. A better arrangement would be to locate the attachment sides in a nearly horizontal position over the non-pivotable center portion of the attachment. However, the outer feeder housings of the attachment sides are usually of such width to prevent this type of arrangement. Smaller outer feeder housings may be used to overcome this problem, but this reduces the working width of the attachment.

SUMMARY OF THE INVENTION

The present invention is directed to overcoming one or more of the problems set forth above.

It is an object of the invention to develop a method and an apparatus for pivoting multiple-part attachments from a working position into a non-working position that has a permissible transport width. The multiple-part attachment should have feeder housings flanged outwardly in the working position and yet allow pivoting of the side portions into a transport position located above the non-pivotable center portion without the side portions colliding into each other.

In accordance with one aspect of the invention, there is provided a multiple-part attachment for an agricultural machine including a main frame having a plurality of inner row crop dividers; first and second side frames each having a plurality of inner row crop dividers and an outer row crop divider; means for moving the first side frame and the second side frame from a working position to a non-working position in which the side frames overlie the main frame; and at least one adjusting device on each side frame and associated with its respective outer row crop divider for moving the outer row crop divider relative to its adjacent inner row crop divider as the side frames move between the working and non-working positions.

According to another aspect of the invention, there is provided a method of moving side frames of a multiple-part frame attachment of an agricultural machine, the multiple-part frame including a central frame portion comprising about half of the total width of the frame and first and second side frame portions each comprising about one-quarter of the total width of the frame, the frame carrying a plurality of row crop dividers including outer row crop dividers at the distal end of each side frame, the method comprising the steps of: pivoting the first side frame and the second side frame from a lower working position to an upper non-working position in which the side frames overlie the central frame portion; and moving the outermost divider of each side frame toward its adjacent inner row crop divider so that the outermost dividers do not interfere in the non-working position.

Because the outer divider is movable relative to the adjacent inner divider when the side frames move from a working position to a non-working position, the outer dividers will not collide with each other when in the transport position and the feeder housings can achieve a greater working width when in the working position. The angle of opening between the outer divider and the adjacent inner divider can be varied to achieve a desirable attachment width.

An advantageous embodiment is achieved if the variation in the angle of opening is effected automatically, so that the carrier vehicle driver is not burdened with external actuation of adjusting members.

A particularly cheap embodiment of this apparatus is achieved if the variation in the angle of opening is effected passively, so that cost-intensive, actively driven adjusting members, such as lifting cylinders, can be eliminated.

While the side frames move into the non-working position, the angle of opening between the respective outer row crop divider and the adjacent inner row crop divider decreases so that when the side frames reach the non-working position the respective outer row crop dividers do not extend beyond the edges of the respective side frames.

A relatively simple version of the invention is achieved if the outer row crop dividers of the side frames are each associated with an adjusting device which performs the relative movement of the outer row crop dividers relative to the adjacent inner row crop dividers.

A structurally simple, space-saving and cheap apparatus for carrying out the invention is achieved if the adjusting device is in two parts, wherein the two parts, or adjusting units, are connected to each other by a vertical pivot shaft, a horizontal pivot shaft, and a coupling element.

The relative movement of the outer row crop dividers can be controlled by the adjusting units, wherein one of the adjusting units has a profile with a slideway, wherein the coupling element is guided by the slideway and in the process forces both a horizontal and a vertical movement.

Stops may be employed to limit the angle between the outer row crop divider and the adjacent inner row crop divider to a specific range.

In a simple embodiment of the coupling element, the coupling element is constructed as a guide rod.

In another aspect of the invention, the profile can be pivotable and lockable in different positions on the associated adjusting unit, so that the position of the slideway varies relative to the coupling element. The ability to obtain different pivot ranges is of particular importance. A small pivot range for the outer row crop divider would be desirable to reduce wear. However, a greater pivot range must be set whenever additional devices known in the art are associated with the outer row crop dividers.

To increase the stability of the outer row crop dividers in the working position, the front adjusting unit can be locked into position by securing means, such as screw connections.

To reduce the impact loads applied to the front attachment while working in the field and on pivoting of the side frames, both the pivot movement of the front adjusting unit about the pivot shaft arranged on the rear adjusting unit, and the pivot movement of the outer row crop dividers about the pivot shaft arranged on the side frames can be damped by suitable means.

In another aspect of the invention there is provided a multiple-part front agricultural machine attachment, wherein each attachment side is independently pivotable.

In another aspect of the invention there is provided a method for independently pivoting the attachment sides of a multiple-part front agricultural machine attachment.

The above aspects are merely illustrative and should not be construed as all-inclusive.

BRIEF DESCRIPTION OF THE DRAWINGS

Reference is now made to the drawings which illustrate the best known mode of carrying out the invention and wherein the same reference characters indicate the same parts throughout the views.

DETAILED DESCRIPTION

Figure 1:
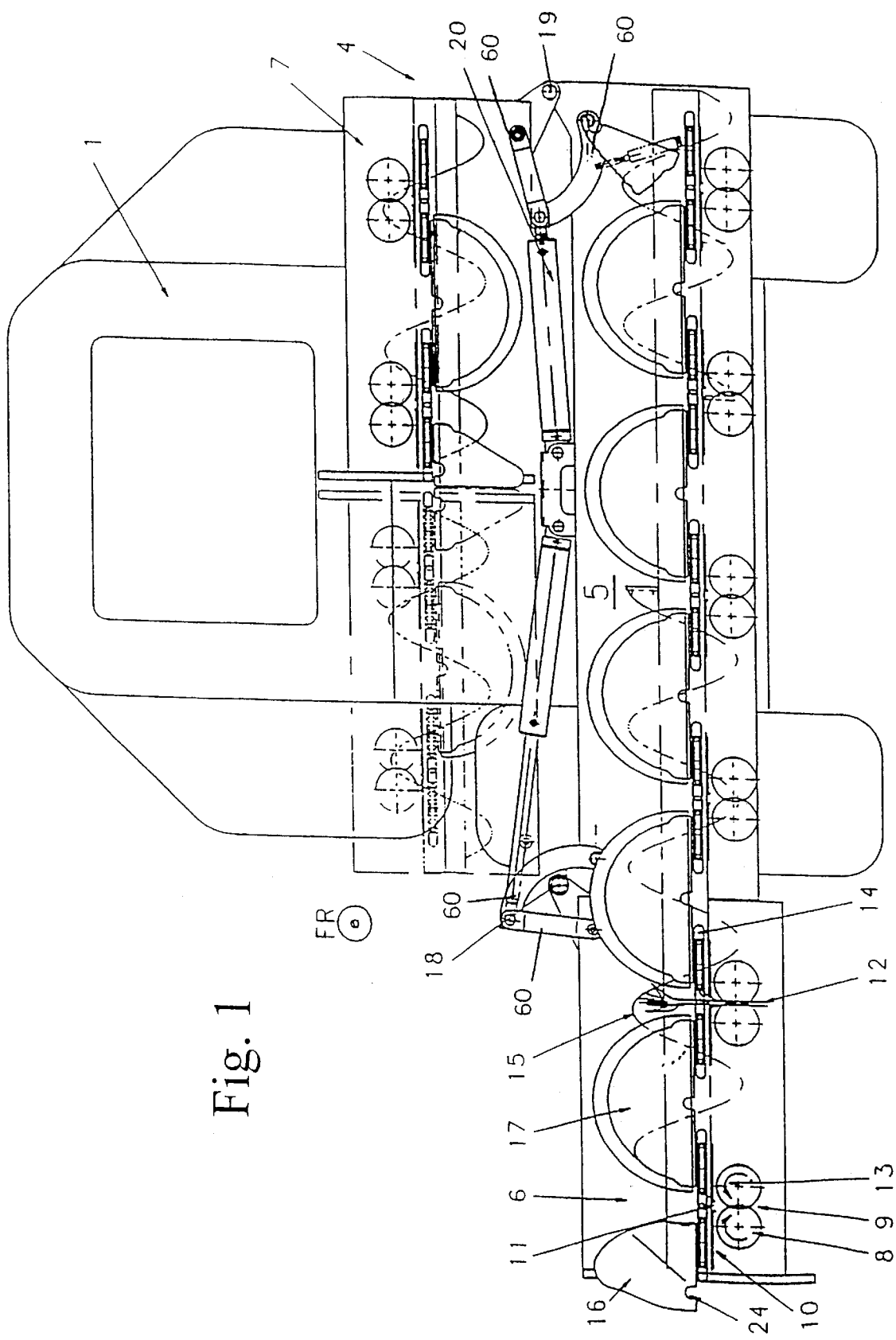
FIG. 1 is a schematic front view of a harvesting apparatus embodying the invention.
Figure 2:
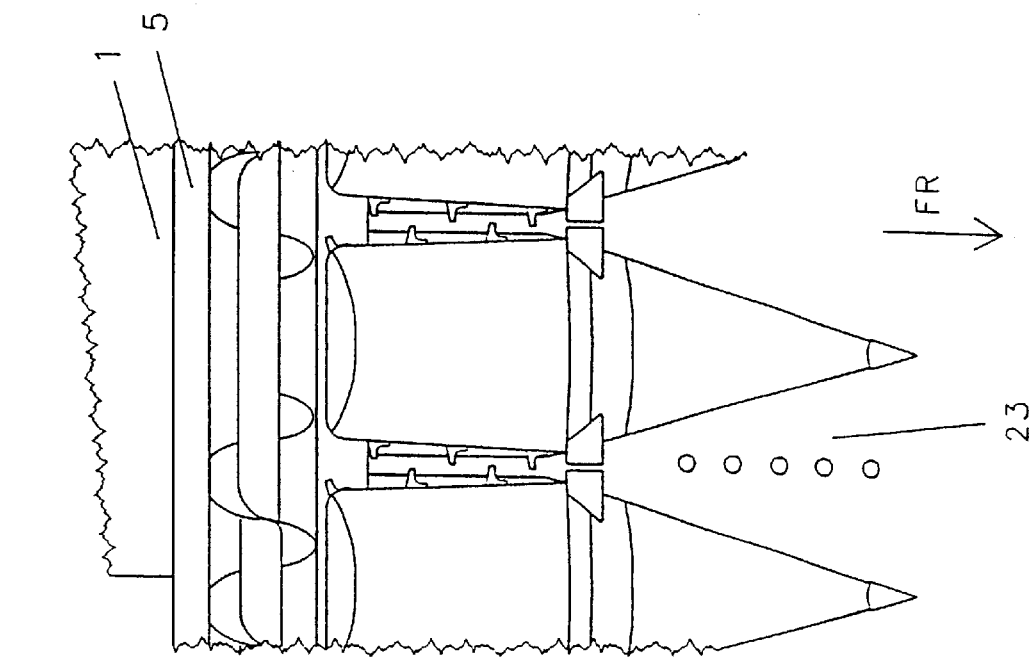
FIG. 2 is a fragmentary top view of the harvesting apparatus.
Figure 2:
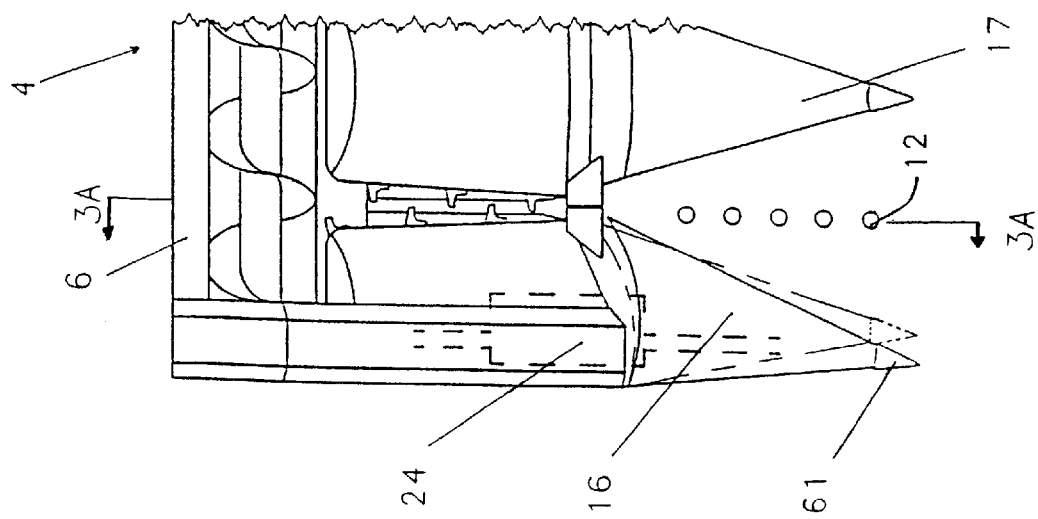

FIG. 1 shows an agricultural machine 1 having a front and a rear. In the preferred embodiment shown, the agricultural machine 1 is a combine harvester, but other embodiments are possible. In the front region, the agricultural machine 1 has a harvesting attachment 4, preferably shown as a picker. The harvesting attachment 4 is formed by a main frame 5, a first side frame 6, and a second side frame 7. The main frame 5, the first side frame 6, and the second side frame 7 each have an upper side and a ground side. The first side frame 6 and the second side frame 7 each have an inner region and an outer region, with the inner region being closest to the tractor when the first side frame 6 and the second side frame 7 are in the working position. The main frame 5 is operatively connected to the agricultural machine 1. First pivot shafts 18, second pivot shafts 19, plates 60 and an adjusting means 20 operatively connect the main frame 5 to the first side frame 6 and the second side frame 7. In the preferred embodiment, the adjusting means 20 is shown as a pair of hydraulic lifting cylinders. Associated with the main frame 5, the first side frame 6, and the second side frame 7 are snapping rollers 8. The snapping rollers 8 cooperate in pairs on the ground side of the main frame 5, the first side frame 6, and the second side frame 7. Above the snapping rollers 8 are snapping plates 10. The snapping plates 10 cooperate in pairs, forming snapping gaps 11. Above the snapping gaps 11 are conveyor chains 14. Associated with the main frame 5, the first side frame 6, and the second side frame 7 are inner row crop dividers 17, which are located above the conveyor chains 14. An outer row crop divider 16 is associated with each of the first side frame 6 and the second side frame 7. The outer row crop divider 16 is located in the outer region of the respective first side frame 6 and the second side frame 7. The outer row crop divider 16 is only partially hood-shaped and is considerably narrower than the inner row crop dividers 17. Referring to FIG. 2, the outer row crop divider 16 has an outermost tip 61.

If the outer row crop divider 16 is at a right angle to the main frame 5, stalk guiding will be impaired due to the narrow width of the outer row crop divider 16. Therefore, it is desirable to angle the outermost tip 61 toward the outer region of the respective first side frame 6 and the second side frame 7. However, if the outermost tip 61 is angled toward the respective outer region when the first side frame 6 and the second side frame 7 are moved into the non-working position, the outer row crop divider 16 attached to the first side frame 6 and the other outer row crop divider 16 attached to the second side frame 7 will collide because the first side frame 6 and the second side frame 7 are located a short distance from each other on the upper side of the main frame 5. To avoid this problem, each of the outer row crop dividers 16 is associated with an adjusting device 24 that angles the outermost tip 61 toward the outer region of the respective first side frame 6 and the second side frame 7 when in the working position and angles the outermost tip 61 toward the inner region of the respective first side frame 6 and the second side frame 7 when in the non-working position. In this manner the outer row crop dividers 16 may be flared outwardly in the working position and disposed in a non-interfering location in the non-working, overlying position.

In the preferred embodiment, there are two adjusting devices 24, with one of the adjusting devices 24 operatively connected to the first side frame 6 and one of the adjusting devices 24 operatively connected to the second side frame 7.

Figure 3A:
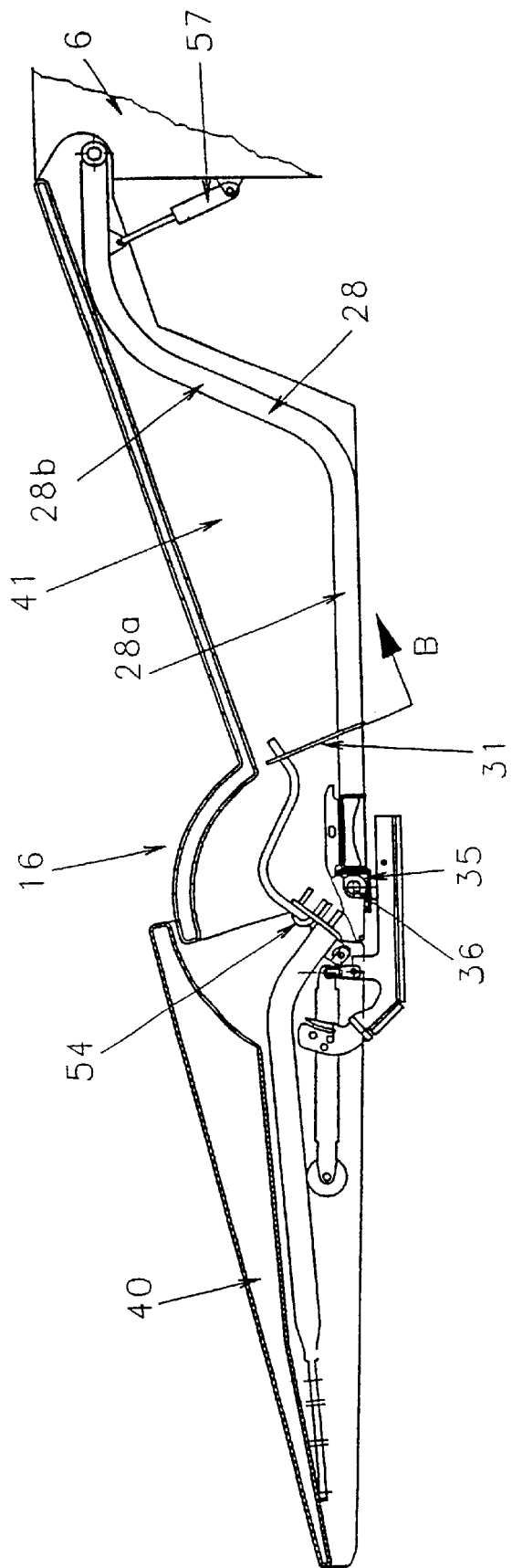
FIG. 3A is a sectional view taken generally along line 3A—3A in FIG. 2 and showing an outer row crop divider but with the auger removed.
Figure 3B:
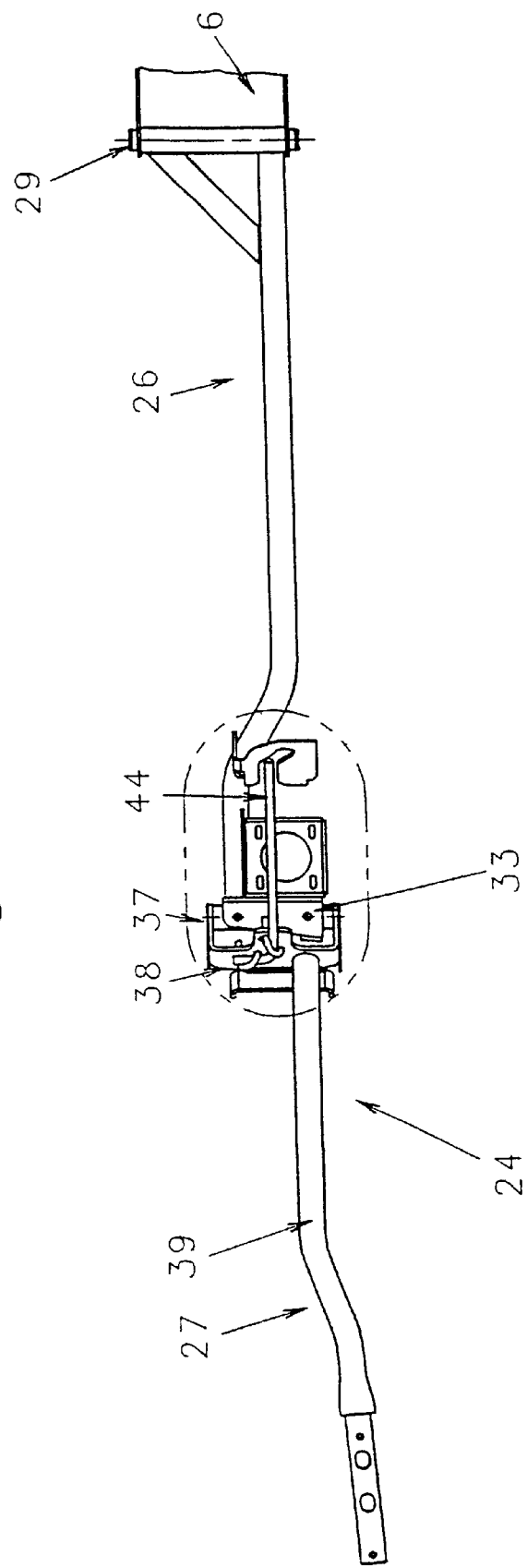
FIG. 3B is a top view of the outer row crop divider shown in FIG. 3A but with the hoods removed.
Figure 4:
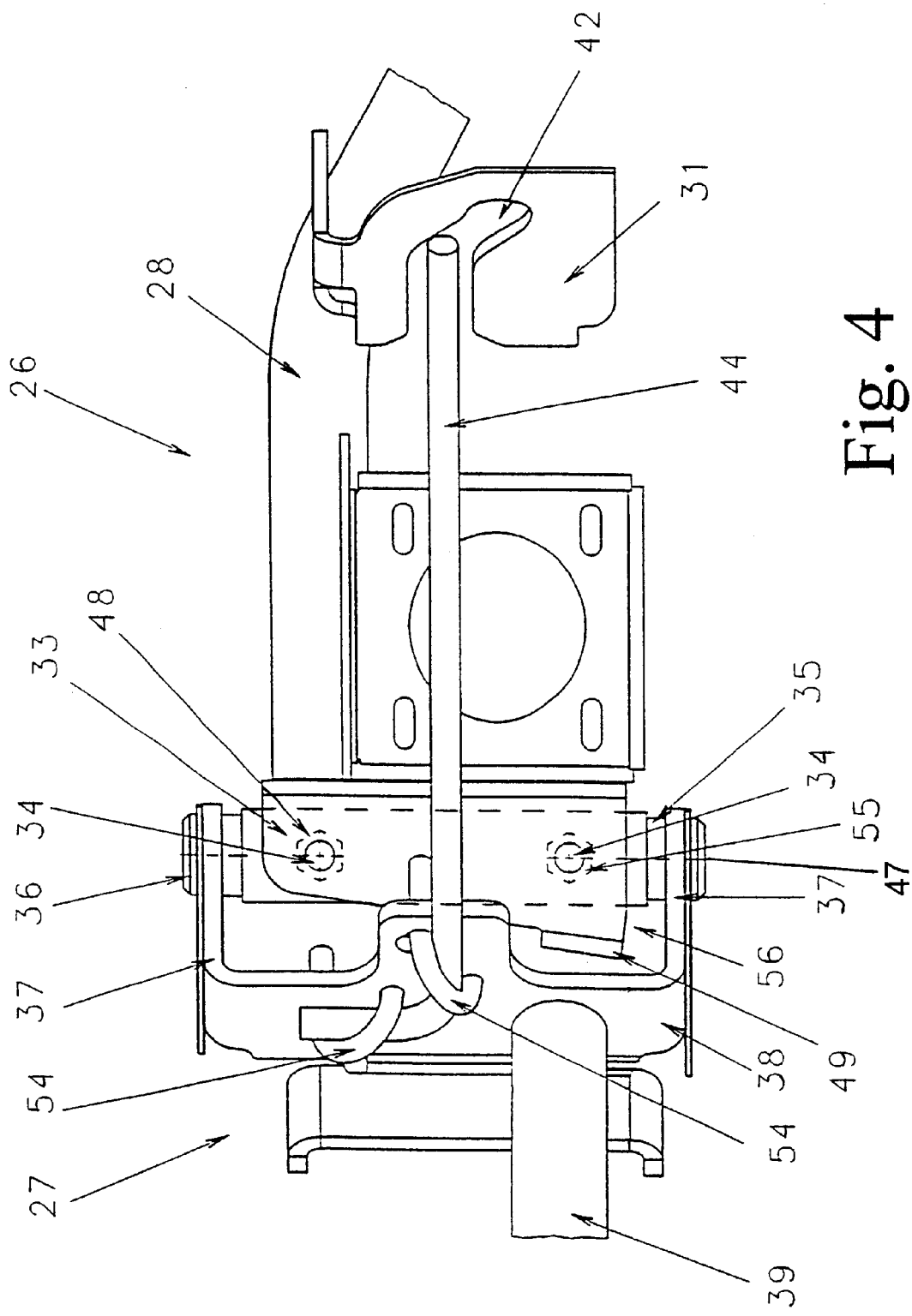
FIG. 4 is a detailed view of an adjusting unit for the outer row crop divider.

Referring to FIGS. 3A, 3B, and 4, the adjusting device 24 is formed by a rear adjusting unit 26 and a front adjusting unit 27. The front adjusting unit 27 is operatively connected to the rear adjusting unit 26 through a coupling element 44 advantageously in the form of a guide rod. The front adjusting unit 27 has a base frame 38. A holding arm 39 is operatively attached to the base frame 38. The rear adjusting unit 26 has a carrying frame 28 having a front and a rear, with the rear being closest to main frame 5. The carrying frame 28 has a horizontal region 28a and a vertical region 28b. The adjusting device 24 is operatively connected to the respective first side frame 6 and the second side frame 7 through the use of the carrying frame 28 in cooperation with a third pivot shaft 29. In the preferred embodiment, there are two of the third pivot shafts 29, with one associated with the first side frame 6 and one associated with the second side frame 7. It is well known in the art that the third pivot shaft 29 may be an axially secured bolt. In the front region of the carrying frame 28, a profile 31 is operatively connected to the carrying frame 28. In the preferred embodiment, the profile 31 is a metal plate and is connected to the carrying frame 28 by welding. Also in the front region of the carrying frame 28, an angle profile 33 is operatively connected to the carrying frame 28. In the preferred embodiment the angle profile 33 is connected to the carrying frame 28 by welding. The angle profile 33 has two holes 34. The angle profile 33 includes a vertical pivot shaft 47. In the preferred embodiment, the vertical pivot shaft 47 is a screw connection. A box profile 35 is operatively connected to the angle profile 33. The box profile 35 has openings to receive a horizontal pivot shaft 36. The base frame 38 has two holding flanges 37. The holding flanges 37 encompass the box profile 35 and also have openings to receive the horizontal pivot shaft 36. Thus, the base frame 38, and hence the front adjusting unit 27, is pivotable about the horizontal pivot shaft 36. The horizontal pivot shaft 36 is also operatively connected to the vertical pivot shaft 47. Thus, the horizontal pivot shaft 36, and hence the front adjusting unit 27, is pivotable about the vertical pivot shaft 47. The rotation about the vertical pivot shaft 47 may be limited by a stop 49.

In the preferred embodiment, the stop 49 is a plate operatively connected to the angle profile 33.

Each of the outer row crop dividers 16 has a front divider hood 40 and a rear divider hood 41. The front divider hood 40 and the rear divider hood 41 are pivotably connected to each other in a manner not shown. The front divider hood 40 is operatively connected to the holding arm 39. The rear divider hood 41 is operatively connected to the carrying frame 28.

Figure 5:
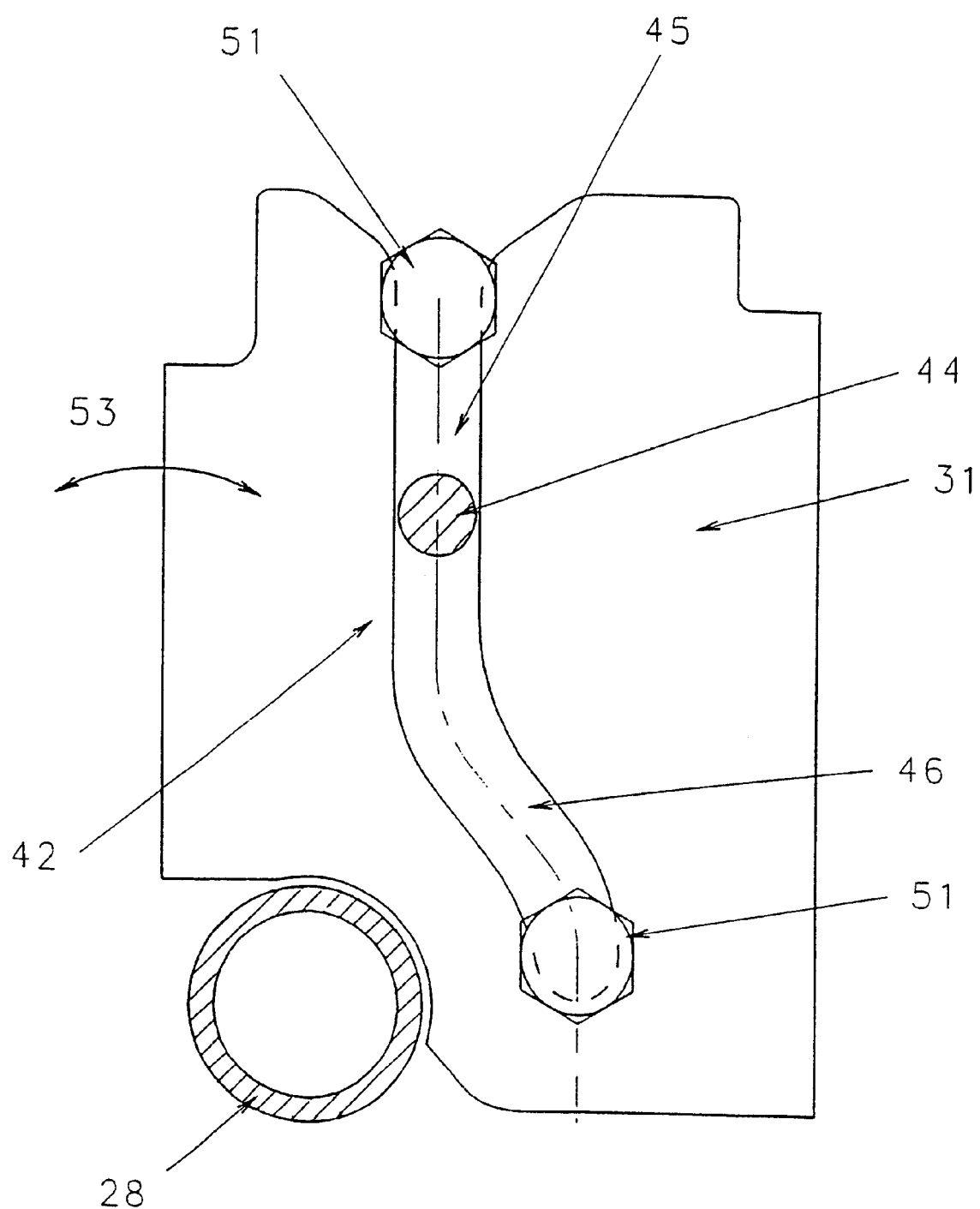
FIG. 5 is a detailed view of a profile as seen from arrow B in FIG. 3A.

Referring now to FIG. 5, the profile 31 has a slideway 42. The coupling element 44 passes through the slideway 42. The slideway 42 limits the movement of the coupling element 44. As such, the front adjusting unit 27 is pivotable in two directions but directed in movement by the coupling element 44 in combination with the slideway 42. In the preferred embodiment, the coupling element 44 may move freely throughout the entire slideway 42. However, in a further embodiment, it may be desirable to limit the travel of the coupling element 44 through the use of a slideway stop 51. The slideway stop 51 may be placed at any point along the slideway 42, thereby limiting the travel of the coupling element 44. More than one slideway stop 51 may be used to limit the travel of the coupling element 44. In this further embodiment, the slideway stop 51 may be a screw connection. In yet another embodiment of the present invention, the profile 31 may be rotated about the carrying frame 28 so as to adjust the position of the slideway 42 relative to the coupling element 44, wherein the coupling element 44 is releasably connected to the base frame 38. In this last embodiment, the coupling element 44 is releasably connected by means of adjusting screws.

Referring again to FIG. 3A, a damping element 57 can be associated with the carrying frame 28 and pivotably connected to the respective first side frame 6 or the second side frame 7. The damping element 57 would reduce impact stresses on the outer row crop divider 16.

Referring again to FIG. 4, a damping insert 56 may be inserted between the angle profile 33 and the box frame 35. The damping insert 56 would reduce impact stresses when the front adjusting unit 27 rotates about the vertical pivot shaft 47.

In operation, the harvesting attachment 4 is transformed from a working position to a non-working position. First, the adjusting means 20 is engaged. In the preferred embodiment, this entails actuating lifting cylinders. The lifting cylinders act upon the first pivot shafts 18. The first pivot shafts 18 act upon the steel plates 60. Forces from the lifting cylinders acting upon the steel plates 60 cause the respective first side frame 6 and the second side frame 7 to rotate about the second pivot shafts 19. When the first side frame 6 and the second side frame 7 rotate to some point beyond vertical, the force of gravity acts upon the outer row crop dividers 16 causing the rear adjusting unit 26 to rotate about the third pivot shaft 29 and the front adjusting unit 27 to rotate about both the vertical pivot shaft 47 and the horizontal pivot shaft 36. While the force of gravity is used in the preferred embodiment, other forces, such as those provided by lifting cylinders, may be employed.

To again return to a working position, the adjusting means 20 is engaged. In the preferred embodiment, this entails actuating lifting cylinders. The lifting cylinders act upon the first pivot shafts 18. The first pivot shafts 18 act upon the steel plates 60. Forces from the lifting cylinders acting upon the steel plates 60 cause the respective first side frame 6 and the second side frame 7 to rotate about the second pivot shafts 19. When the first side frame 6 and the second side frame 7 rotate to some point beyond vertical, the force of gravity acts upon the outer row crop dividers 16 causing the rear adjusting unit 26 to rotate about the third pivot shaft 29 and the front adjusting unit 27 to rotate about both the vertical pivot shaft 47 and the horizontal pivot shaft 36. While the force of gravity is used in the preferred embodiment, other forces, such as those provided by lifting cylinders, may be employed. When the first side frame 6 and the second side frame 7 are returned to the working position, the front adjusting unit 27 may be prevented from rotating about the vertical pivot shaft 47 by means of fastener in combination with one of the two bores 34. When in the working position, stalk crop 12 is picked up by the snapping rollers 8. The snapping rollers 8, on account of their rotary movement, pull the stalk crop 12 through the snapping gap 11. The snapping gap plates 10 strip the multiple grains from the stalks. The stripped multiple grains are conveyed by the conveyor chains 14 to the agricultural machine 1.

It is within the scope of the invention that the method described and the apparatus suitable for carrying out the method are not confined to pickers as in the embodiments shown, but can be used on any agricultural machine to obtain the effects described.

What is claimed is:

1. A method of moving side frames of a multiple-part frame attachment of an agricultural machine, the multiple-part frame including a central frame portion comprising about half of the total width of the frame and first and second side frame portions each comprising about one-quarter of the total width of the frame, the frame carrying a plurality of row crop dividers including outer row crop dividers at the distal end of each side frame, the method comprising the steps of:

pivoting the first side frame and the second side frame from a lower working position to an upper non-working position in which the side frames overlie the central frame portion; and moving the outer row crop divider of each side frame toward its adjacent inner row crop divider so that the outer row crop dividers do not interfere in the non-working position;

pivoting the first side frame and the second side frame from the upper non-working position to the lower working position;

selectively varying the angle between the outer row crop dividers and their adjacent inner row crop dividers so that a position of an outermost tip of the outer row crop divider is selectively varied; and wherein the step of selectively varying the angle includes the step of automatically varying the angle between the outer row crop dividers and their adjacent inner row crop dividers so that the position of the outermost tip of the outer row crop divider is automatically selectively varied.

2. The method according to claim 1, wherein the step of selectively varying the angle includes the step of manually controlling the angle between the outer row crop dividers and their adjacent inner row crop dividers so that the position of the outermost tip of the outer row crop divider is selectively varied.

3. The method according to claim 1, wherein the step of selectively varying the angle includes the steps of: providing at least one stop for positioning the outer row crop divider; and moving the outer row crop divider to a position limited by the stop.

4. A method of moving side frames of a multiple-part frame attachment of an agricultural machine, the multiple-part frame including a central frame portion comprising about half of the total width of the frame and first and second side frame portions each comprising about one-quarter of the total width of the frame, the frame carrying a plurality of row crop dividers including outer row crop dividers at the distal end of each side frame, the method comprising the steps of:

pivoting the first side frame and the second side frame from a lower working position to an upper non-working position in which the side frames overlie the central frame portion;

moving the outer row crop divider of each side frame toward its adjacent inner row crop divider so that the outer row crop dividers do not interfere in the non-working position; and wherein an angle variance decreases as the first side frame and the second side frame move toward the non-working position.

5. A multiple-part attachment for an agricultural machine comprising:

a main frame having a plurality of inner row crop dividers;

first and second side frames each having a plurality of inner row crop dividers and an outer row crop divider;

means for moving the first side frame and the second side frame from a working position to a non-working position in which the side frames overlie the main frame;

an adjusting device on each side frame and associated with its respective outer row crop divider for moving the outer row crop divider relative to its adjacent inner row crop divider as the side frames move between the working and non-working positions; and whereby the adjusting device comprises means for automatically selectively varying an angle between the outer row crop dividers and their adjacent inner row crop dividers so that a position of an outermost tip of the outer row crop divider is automatically selectively varied.

6. The multiple-part attachment according to claim 5, wherein the adjusting device has a front adjusting unit, a rear adjusting unit, and a coupling element, wherein the rear adjusting unit is operatively connected to the respective first side frame or second side frame, and the front adjusting unit is operatively connected to the rear adjusting unit by means that allow the front adjusting unit to pivot about at least one vertical pivot shaft and at least one horizontal pivot shaft.

7. The multiple-part attachment according to claim 6, wherein the rear adjusting unit includes a profile that the coupling element at least partially passes through.

8. The multiple-part attachment according to claim 7, wherein the profile is a metal plate and has a slideway for guiding the coupling element.

9. The multiple-part attachment according to claim 8, including at least one stop for limiting the pivot movement of the front adjusting unit about the vertical pivot shaft.

10. The multiple-part attachment according to claim 9, wherein the cooperation of the profile, the vertical shaft, and the horizontal pivot shaft allow the coupling element to have both vertical and horizontal movement.

11. The multiple-part attachment according to claim 10, wherein the coupling element is a guide rod.

12. The multiple-part attachment according to claim 11, wherein the profile is non-rotatably connected to the rear adjusting unit and the slideway is limited by at least one slideway stop.

13. The multiple-part attachment according to claim 12, wherein the profile is operatively connected to the rear adjusting unit and so constructed and arranged that it can be set to and locked in different positions.

14. The multiple-part attachment according to claim 13, wherein the vertical pivot shaft is non-rotatable.

15. The multiple-part attachment according to claim 14, including means for damping the pivot movement of the front adjusting unit about the vertical pivot shaft.

16. The multiple-part attachment according to claim 8, wherein the adjusting device is pivotably connected to the first side frame by means of a third pivot shaft and the adjusting device is pivotably connected to the second side frame by means of the third pivot shaft.

17. The multiple-part attachment according to claim 16, including means for damping the pivot movement of the adjusting device about the third pivot shaft.

18. The multiple-part attachment according to claim 5, wherein the adjusting device is a lifting cylinder.

19. The multiple-part attachment according to claim 18, wherein the adjusting device has a front adjusting unit and a rear adjusting unit; and including:

a first pivot shaft;

a second pivot shaft;

a plurality of plates;

a vertical pivot shaft pivotably connecting the front adjusting unit to the rear adjusting unit;

a horizontal pivot shaft pivotably connecting the front adjusting unit to the rear adjusting unit;

a metal plate having a slideway and being operatively connected to the rear adjusting unit;

a guide rod that at least partially passes through the slideway;

a third pivot shaft pivotably connecting the adjusting device to one of the first and second side frames;

a stop for limiting rotation of the front adjusting unit about the vertical shaft;

a slideway stop for limiting the guide rod;

a damping element to reduce impact stresses when the outer row crop divider pivots about the third pivot shaft; and a damping insert to reduce impact stresses when the front adjusting unit rotates about the vertical pivot shaft;

whereby the first pivot shaft, the second pivot shaft, and the plurality of plates operatively connect the first and second side frames to the main frame;

whereby the lifting cylinder acts upon the first pivot shaft; and whereby the metal plate with the slideway and the guide rod cooperate to control movement of the front adjusting unit about the horizontal pivot shaft and the vertical pivot shaft.

\* \* \* \* \*